(12) United States Patent
Liles

(10) Patent No.: US 12,448,896 B2
(45) Date of Patent: Oct. 21, 2025

(54) LOCALIZED THICKENING PLY REINFORCEMENT WITHIN CERAMIC MATRIX COMPOSITE AIRFOIL CAVITY

(71) Applicant: RTX Corporation, Farmington, CT (US)

(72) Inventor: Howard J. Liles, Newington, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/236,263

(22) Filed: Aug. 21, 2023

(65) Prior Publication Data

US 2025/0067184 A1 Feb. 27, 2025

(51) Int. Cl.
*F01D 5/28* (2006.01)

(52) U.S. Cl.
CPC .......... *F01D 5/282* (2013.01); *F05B 2230/30* (2013.01); *F05B 2280/6003* (2013.01)

(58) Field of Classification Search
CPC ...................................................... F01D 5/282
USPC ........................................................ 416/230
See application file for complete search history.

(56) References Cited

U.S. PATENT DOCUMENTS

| 3,420,502 | A  | * | 1/1969  | Howald    | F01D 5/187 |
|           |    |   |         |           | 415/115    |
| 7,487,819 | B2 | * | 2/2009  | Wang      | B22C 9/10  |
|           |    |   |         |           | 164/369    |
| 10,174,627| B2 |   | 1/2019  | Chang et al. | |
| 11,162,432| B2 | * | 11/2021 | Packer    | F01D 9/041 |
| 11,530,614| B2 |   | 12/2022 | Burdette et al. | |
| 11,905,847| B1 | * | 2/2024  | Banhos    | F01D 5/282 |
| 2015/0152734 | A1 | * | 6/2015 | Ceglio | F01D 5/186 |
|           |    |   |         |           | 416/97 R |
| 2016/0003072 | A1 | * | 1/2016 | Chang | F01D 9/041 |
|           |    |   |         |           | 156/189 |
| 2017/0268345 | A1 | * | 9/2017 | Groves, II | F01D 5/186 |
| 2019/0383148 | A1 | * | 12/2019 | Ertl | F01D 5/187 |
| 2020/0072066 | A1 |   | 3/2020 | Thomas et al. | |
| 2022/0268165 | A1 | * | 8/2022 | Burdette | F01D 5/282 |
| 2023/0383657 | A1 | * | 11/2023 | Kim | F01D 5/282 |

OTHER PUBLICATIONS

Partial European Search Report for EP Application No. 24195694.5, dated Feb. 20, 2025, 14 pages.

* cited by examiner

*Primary Examiner* — J. Todd Newton
(74) *Attorney, Agent, or Firm* — Kinney & Lange, P.A.

(57) ABSTRACT

A CMC component for a gas turbine engine includes an airfoil including a leading edge, a trailing edge, a suction sidewall, and a pressure sidewall having a locally-thickened region, the locally-thickened region being a maximum thickness region of the pressure sidewall. The locally-thickened region has a first thickness, a maximum thickness region of the suction sidewall has a second thickness, and the first thickness is greater than the second thickness.

16 Claims, 5 Drawing Sheets

LOCALIZED THICKENING PLY REINFORCEMENT WITHIN CERAMIC MATRIX COMPOSITE AIRFOIL CAVITY

BACKGROUND

The present disclosure relates generally to ceramic matrix composite (CMC) structures in gas turbine engines and more particularly to CMC vanes.

A gas turbine engine typically includes a fan section, a compressor section, a combustor section, and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. CMC materials are also being considered for airfoils. Among other attractive properties, CMCs have high temperature resistance. Despite this attribute, however, there are unique challenges to implementing CMCs in airfoils.

SUMMARY

A CMC component for a gas turbine engine includes an airfoil including a leading edge, a trailing edge, a suction sidewall, and a pressure sidewall having a locally-thickened region, the locally-thickened region being a maximum thickness region of the pressure sidewall. The locally-thickened region has a first thickness, a maximum thickness region of the suction sidewall has a second thickness, and the first thickness is greater than the second thickness.

A method of forming a CMC component includes identifying stress regions in the component exceeding a threshold value, subsequently, forming a preform by laying up a first subset of plies over a mandrel, laying up at least one reinforcing ply over the first subset of plies, the at least one reinforcing ply coextensive with the stress regions, and laying up a second subset of plies over the at least one reinforcing ply. The method further includes densifying the preform with a ceramic matrix.

A vane assembly for a gas turbine engine includes an inner case, an outer case, and at least one CMC vane coupled between the inner case and the outer case, the at least one CMC vane including an inner diameter platform, an outer diameter platform, and an airfoil connected to and extending between the inner diameter platform and the outer diameter platform, the airfoil including a leading edge, a trailing edge, a suction sidewall, and a pressure sidewall comprising a locally-thickened region extending from the inner diameter platform or the outer diameter platform toward a midspan region pressure sidewall, the locally-thickened region being a maximum thickness region of the pressure sidewall. The locally-thickened region has a first thickness, a maximum thickness region of the suction sidewall has a second thickness, and the first thickness is greater than the second thickness.

Figure 1:
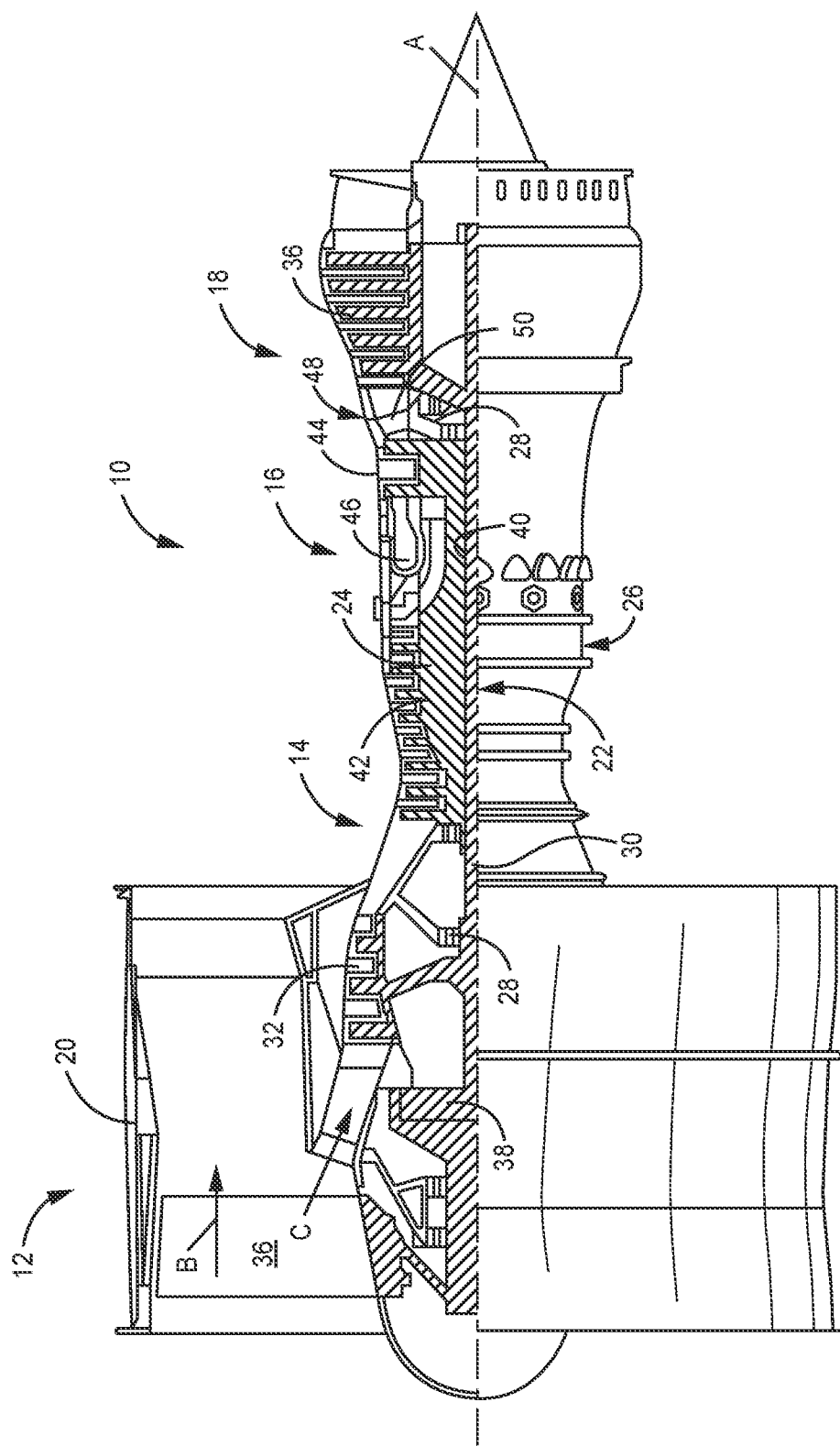
FIG. 1 is a simplified cross-sectional view of an exemplary embodiment of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 schematically illustrates gas turbine engine 10. Gas turbine engine 10 is disclosed herein as a two-spool turbofan that generally incorporates fan section 12, a compressor section 14, combustor section 16, and turbine section 18. Fan section 12 drives air along bypass flow path B in a bypass duct defined within housing 20, such as a fan case or nacelle, and also drives air along core flow path C for compression and communication into combustor section 16 then expansion through turbine section 18. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 10 generally includes low speed spool 22 and high speed spool 24 mounted for rotation about an engine central longitudinal axis A relative to engine static structure 26 via several bearing systems 28. It should be understood that various bearing systems 28 at various locations may alternatively or additionally be provided, and the location of bearing systems 28 may be varied as appropriate to the application.

Low speed spool 22 generally includes inner shaft 30 that interconnects, a first (or low) pressure compressor 32 and a first (or low) pressure turbine 34. Inner shaft 30 is connected to fan 36 through a speed change mechanism, which in exemplary gas turbine engine 10 is illustrated as geared architecture (i.e., fan drive gear system) 38 to drive fan 36 at a lower speed than low speed spool 22. High speed spool 24 includes outer shaft 40 that interconnects a second (or high) pressure compressor 42 and a second (or high) pressure turbine 44. Combustor 46 is arranged in the exemplary gas turbine 10 between high pressure compressor 42 and high pressure turbine 44. Mid-turbine frame 48 of engine static structure 26 may be arranged generally between high pressure turbine 44 and low pressure turbine 34. Mid-turbine frame 48 further supports bearing systems 28 in the turbine section 18. Inner shaft 30 and outer shaft 40 are concentric and rotate via bearing systems 28 about the engine central longitudinal axis A which is collinear with their longitudinal axes.

The core airflow is compressed by low pressure compressor 32 then high pressure compressor 42, mixed and burned with fuel in the combustor 46, then expanded through high pressure turbine 44 and low pressure turbine 34. Mid-turbine frame 48 includes airfoils 50 which are in core airflow path C. Turbines 34, 44 rotationally drive the respective low speed spool 22 and high speed spool 24 in response to the expansion. It will be appreciated that each of the positions of the fan section 12, compressor section 14, combustor section 16, turbine section 18, and geared architecture 38 may be varied. For example, geared architecture 38 may be located aft of low pressure compressor 32, aft of combustor section 16, or even aft of turbine section 18, and fan 36 may be positioned forward or aft of the location of fan drive gear system 38.

Engine 10 in one example is a high bypass geared aircraft engine. In a further example, the engine bypass ration is greater than about six (6), with an example embodiment being greater than about ten (10), and can be less than or equal to about 18.0, or more narrowly can be less than or equal to 16.0. The geared architecture 38 is an epicyclic gear train, such as a planetary gear system or other gear system, with a gear reduction ratio of greater than about 2.3. The gear reduction ratio may be less than or equal to 4.0. Low pressure turbine 34 has a pressure ratio that is greater than about five. The low pressure turbine pressure ratio can be less than or equal to 13.0, or more narrowly less than or equal to 12.0. In one disclosed embodiment, engine bypass ratio is greater than about ten (10:1), the diameter of fan 36 is significantly larger than that of low pressure compressor 32, and low pressure turbine 34 has a pressure ratio that is greater than about five 5:1. The low pressure turbine pressure ratio is pressure measured prior to an inlet of low pressure turbine 34 as related to the pressure at the outlet of low pressure turbine 34 prior to an exhaust nozzle. Geared architecture 38 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by bypass flow B due to the high bypass ratio. Fan section 12 of engine 10 is designed for a particular flight condition, typically cruise at about 0.8 Mach and about 35,000 feet (10,668 meters). The flight condition of 0.8 Mach and 35,000 ft (10,668 meters), with engine 10 at its best fuel consumption—also known as "bucket cruise Thrust Specific Fuel Consumption ('TSFC')"—is the industry standard parameter of lbm of fuel being burned divided by lbf of thrust engine 10 produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
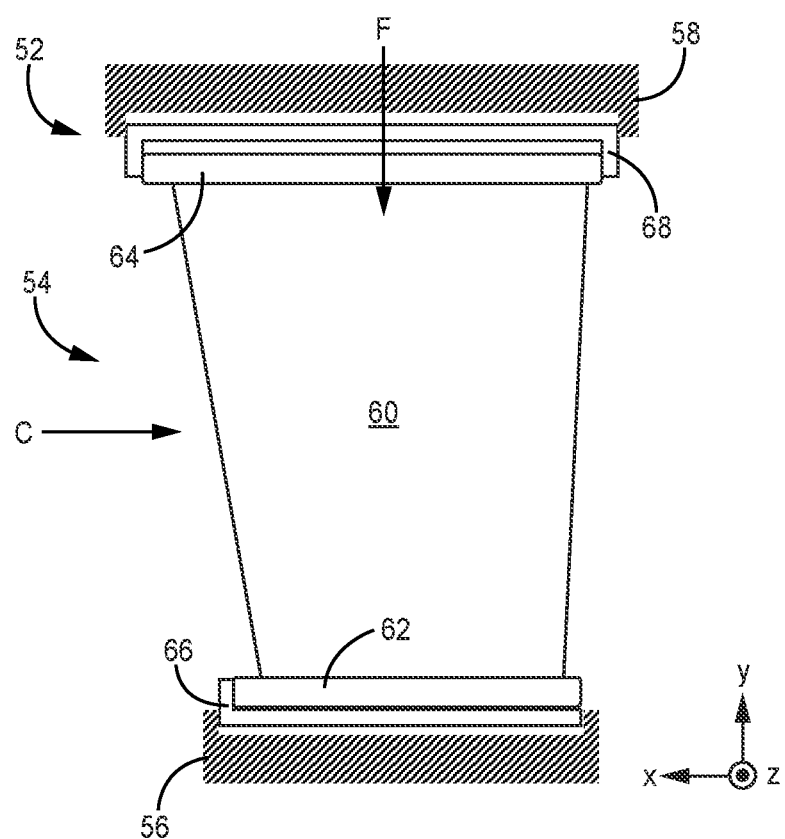
FIG. 2 is a simplified cross-sectional view of a vane assembly for a gas turbine engine, such as the engine of FIG. 1.

FIG. 2 is a simplified cross-sectional illustration of vane assembly 52 of gas turbine engine 10. Vane assembly 52 includes vane 54 coupled between inner case 56 and outer case 58. Vane 54 can be a CMC vane as is discussed in greater detail below. Vane 54 includes airfoil 60 extending in a spanwise direction (i.e., the y-direction) between first, inner diameter (ID) platform 62 and second, outer diameter (OD) platform 64. With respect to engine 10, the relative terms "inner diameter" and "outer diameter" refer to the proximity to longitudinal axis A of engine 10, with the outer diameter being radially further from axis A than the inner diameter. First, inner retaining ring 66 supports and fixes vane 54 relative to inner case 56 and second, outer retaining ring 68 supports and fixes vane 54 relative to outer case 58. Inner retaining ring 66 and outer retaining ring 68 can be annular structures made up on one or more arcuate segments. Cooling airflow F can be supplied to and traverse an inner cavity (shown in FIG. 4) of airfoil 60 in the y-direction relative to the coordinate system shown in FIG. 2, while core airflow C travels in the x-direction.

During operation of engine 10, vane assembly 52 is subjected to various stresses such as internal stresses on the walls of airfoil 60 due to the pressure differential between cooling airflow F and core airflow C, and load transfer to/from ID and/or OD components surrounding vane 54. Increasing thickness of airfoil 60 is one way to manage loads, however this adds weight to vane 54 and makes matrix infiltration more challenging. Further, adding thickness can decrease the volume of the flow path if inner cavity volume is maintained, resulting in reduced turbine throughflow capacity. Increased airfoil thickness can also result in manufacturing producibility challenges as minimum radius of curvature limitation can be encountered in a complex airfoil geometry when trying to incorporate uniform thickness offsets.

Figure 3:
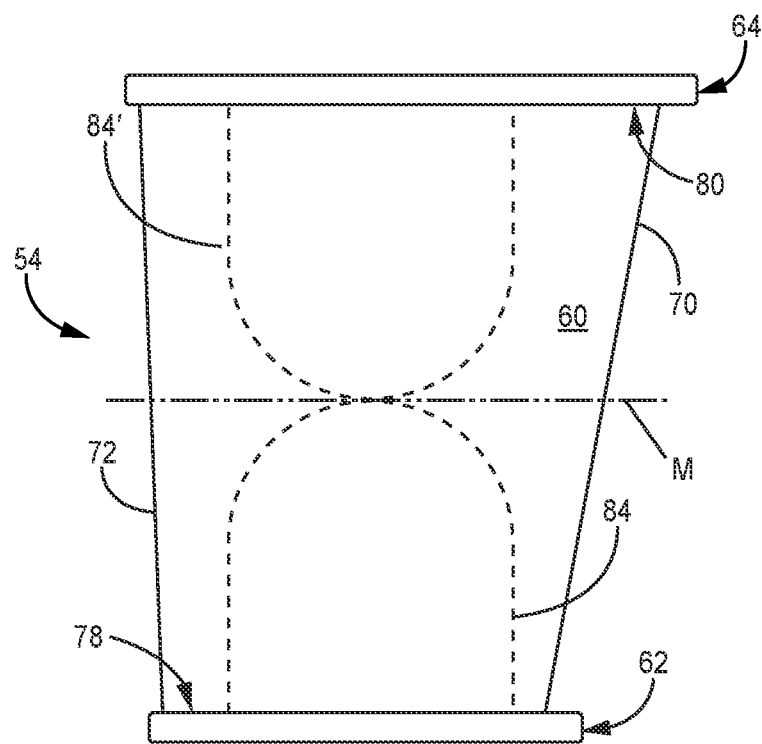
FIG. 3 is a simplified side view showing the pressure side of the stator vane of FIG. 2.
Figure 4:
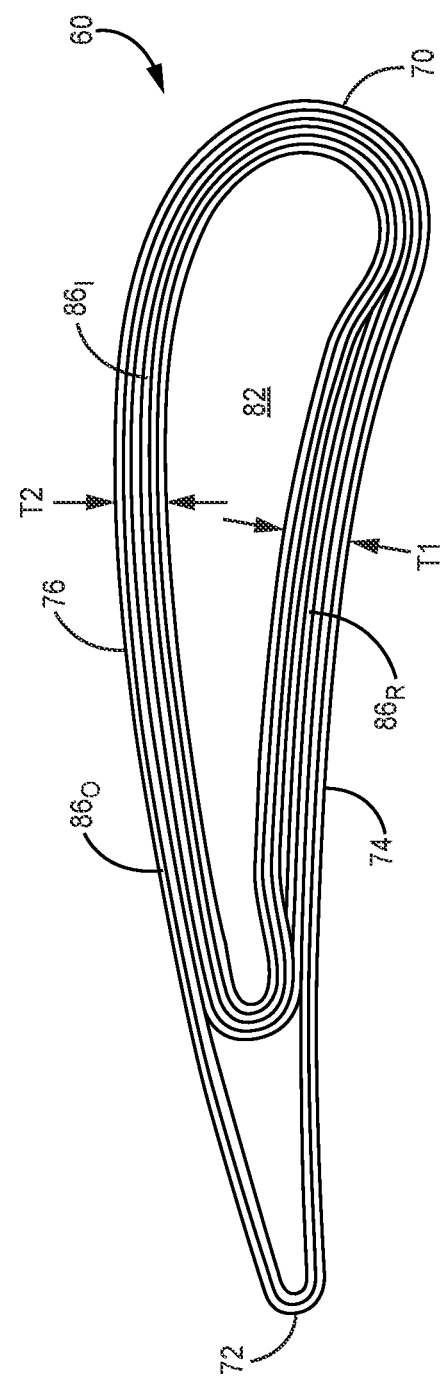
FIG. 4 is a simplified cross-sectional view of an airfoil of the stator vane of FIG. 3.

FIG. 3 is a simplified side view of vane 54 showing pressure sidewall 74. FIG. 4 is a simplified cross-sectional view of airfoil 60 of vane 54 taken below midspan region M (i.e., closer to ID platform 62 than to OD platform 64). FIGS. 3 and 4 are discussed together.

Airfoil 60 includes leading edge 70, trailing edge 72, pressure sidewall 74, and suction sidewall 76. Trailing edge 72 is oppositely disposed from leading edge 70, and suction sidewall 76 is oppositely disposed from pressure sidewall 74. Airfoil 60 is connected to and extends between ID platform 62 and OD platform 64. ID platform 62 and OD platform 64 each include respective gas path surfaces 78 and 80. At least one cooling cavity 82 within airfoil 60 extends between ID platform 62 and OD platform 64.

Vane 54 can be formed from layers of sheets/plies of ceramic fibers arranged in one of various two or three-dimensional woven architectures such as plain, harness (e.g., 3, 5, 8, etc.), twill, braid, or non-symmetric, or from non-woven (e.g., chopped, felted, etc.) fibers. The fibers can be reinforced with a ceramic matrix. The fibers and/or matrix can be formed from silicon carbide (SiC) and/or silicon nitride ($Si_3N_4$). Visible in FIG. 4 is an arrangement of plies forming airfoil 60. More specifically, inner plies $86_I$ are nested within outer plies $86_O$. Reinforcing plies $86_R$ are layered between inner plies $86_I$ on pressure sidewall 74 forming ply pocket 84 (i.e., a locally thickened region). The extent of ply pocket 84 along pressure sidewall 74 is schematically represented in FIG. 3 with dashed lines, although ply pocket is generally formed within pressure sidewall 74, as is discussed in greater detail below. As shown, ply pocket 84 generally extends from 0% span up to midspan region M (i.e., 50% span). In an alternative embodiment, ply pocket 84 can extend beyond or terminate prior to midspan region M. For example, ply pocket 84 can extend to a span ranging from 40% span to 60% span. In another alternative embodiment, it can be preferable to create a locally thickened region between midspan region M and 100% span if pressure loading and constraints on vane 54 are reversed. Accordingly, vane 54 could alternatively include ply pocket 84', which can be substantially similar to ply pocket 84 as discussed below, except for its location on airfoil 60. In yet another alternative embodiment, ply pocket 84 and/or 84' can be formed in suction sidewall 76.

Figure 5:
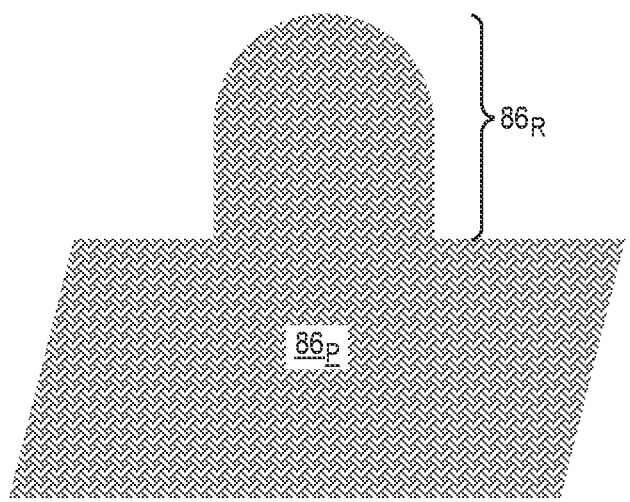
FIG. 5 is a simplified illustration of a fibrous ply used in the construction of the stator vane of FIG. 3.

Ply pocket 84 is designed and incorporated into vane 54 generally as follows. First, the shape and thickness (i.e., number of reinforcing plies $86_R$) of ply pocket 84 can be predetermined via software analysis identifying stress regions on airfoil 60 exceeding a threshold value. The shape and thickness of ply pocket 84 are designed to sufficiently reinforce such regions while minimizing excess material. Preforming begins as one more inner plies $86_I$ are laid up around a mandrel followed by reinforcing plies $86_R$. Rather than using discrete reinforcing plies $86_R$ tailored to the dimensions of ply pocket 84, one or more reinforcing plies $86_R$ can be a section of a larger platform ply $86_P$, as shown in FIG. 5 as a tongue-like projection, and bent at an angle with respect to the remainder of platform ply $86_P$ to form ply pocket 84. As such, each reinforcing ply $86_R$ can be integral to ID platform 62 (or OD platform 64 for ply pocket 84') which can facilitate layup and minimizes manufacturing defects. Additional inner plies $86_I$ can be layered over reinforcing plies $86_R$ before outer plies $86_O$ are wrapped around inner plies $86_I$ and reinforcing plies $86_R$.

Ply pocket 84 can represent a maximum thickness region of pressure sidewall 74 with a thickness T1 which is greater than the thickness of a corresponding and/or maximum thickness region of suction sidewall 76 (i.e., T2) as well as pocket-free regions (e.g., above midspan region M) along pressure sidewall 74. For example, depending on the number of reinforcing plies $86_R$ (e.g., 1, 2, 3, etc.) used to form ply pocket 84, T1, which includes inner plies $86_I$, outer plies $86_O$, and reinforcing plies $86_R$, can be greater than T2, which includes only inner plies $86_I$ and outer plies $86_O$. T1 can be up to 30% greater than T2 in an exemplary embodiment. Advantageously, this localized increase and thickness improves the mechanical properties of vane 54 while minimizing added weight and thickness and maintaining desired flow characteristics.

The preform can be densified with a matrix using CVI to form CMC vane 54. During densification, the plies are infiltrated by reactant vapors, and a gaseous precursor deposits on the ceramic tows. The matrix material can be silicon carbide or other suitable ceramic material. Densification is carried out until the resulting CMC has reached the desired residual porosity. Interface coating(s) (e.g., of boron nitride) can be deposited prior to the matrix. In an alternative embodiment, densification can additionally and/or alternatively include other methodologies such as, but not limited to, melt infiltration (MI) and polymer infiltration and pyrolysis (PIP).

Discussion of Possible Embodiments

The following are non-exclusive descriptions of possible embodiments of the present invention.

A CMC component for a gas turbine engine includes an airfoil including a leading edge, a trailing edge, a suction sidewall, and a pressure sidewall having a locally-thickened region, the locally-thickened region being a maximum thickness region of the pressure sidewall. The locally-thickened region has a first thickness, a maximum thickness region of the suction sidewall has a second thickness, and the first thickness is greater than the second thickness.

The component of the preceding paragraph can optionally include, additionally and/or alternatively, any one or more of the following features, configurations and/or additional components:

In the above component, the first thickness can be up to 30% greater than the second thickness.

In any of the above components, the locally-thickened region can be disposed between 0% and 50% span of the airfoil.

In any of the above components, the locally-thickened region can be disposed between and 50% span and 100% span of the airfoil.

Any of the above components can further include a first platform and a second platform. The airfoil can be connected to and extend between the first platform and the second platform.

In any of the above components, the component can be a vane.

In any of the above components, the pressure sidewall can include a first subset of plies In any of the above components, the locally-thickened region can include at least one additional ply.

In any of the above components, the at least one additional ply can be at least partially disposed within the first platform.

A method of forming a CMC component includes identifying stress regions in the component exceeding a threshold value, subsequently, forming a preform by laying up a first subset of plies over a mandrel, laying up at least one reinforcing ply over the first subset of plies, the at least one reinforcing ply coextensive with the stress regions, and laying up a second subset of plies over the at least one reinforcing ply. The method further includes densifying the preform with a ceramic matrix.

The method of the preceding paragraph can optionally include, additionally and/or alternatively, any one or more of the following features, configurations and/or additional steps:

In the above method, the first subset of plies and the second subset of plies define an airfoil, the airfoil including a leading edge, a trailing edge, a suction sidewall, and a pressure sidewall. The at least one reinforcing ply can be disposed along the pressure sidewall between 0% span and 50% span.

In any of the above methods, the at least one reinforcing ply can be disposed along the pressure sidewall between 0% span and 50% span.

In any of the above methods, the at least one reinforcing ply can be disposed along the pressure sidewall between 50% span and 100% span.

Any of the above methods can further include laying up at least one platform ply at an angle with respect to the at least one reinforcing ply, the at least one reinforcing ply being a projection of the at least one platform ply.

In any of the above methods, the step of densifying the preform with a ceramic matrix comprises one or a combination of chemical vapor infiltration, melt infiltration, and polymer infiltration and pyrolysis.

A vane assembly for a gas turbine engine includes an inner case, an outer case, and at least one CMC vane coupled between the inner case and the outer case, the at least one CMC vane including an inner diameter platform, an outer diameter platform, and an airfoil connected to and extending between the inner diameter platform and the outer diameter platform, the airfoil including a leading edge, a trailing edge, a suction sidewall, and a pressure sidewall comprising a locally-thickened region extending from the inner diameter platform or the outer diameter platform toward a midspan region pressure sidewall, the locally-thickened region being a maximum thickness region of the pressure sidewall. The locally-thickened region has a first thickness, a maximum thickness region of the suction sidewall has a second thickness, and the first thickness is greater than the second thickness.

The assembly of the preceding paragraph can optionally include, additionally and/or alternatively, any one or more of the following features, configurations and/or additional components:

In the above assembly, the first thickness can be 30% greater than the second thickness.

In any of the above assemblies, the pressure sidewall can include a first subset of plies.

In any of the above assemblies, the locally-thickened region can include at least one additional ply.

In any of the above assemblies, the at least one additional ply can be at least partially disposed within the inner diameter platform or the outer diameter platform.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ceramic matrix composite vane for a gas turbine engine comprising:
   an airfoil comprising:
      a leading edge;
      a trailing edge;
      a suction sidewall; and
      a pressure sidewall joined to the suction sidewall at the leading edge and the trailing edge, the pressure sidewall comprising a locally-thickened region,
   a first platform; and
   a second platform, wherein the airfoil is connected to and extends between the first platform and the second platform;
   wherein the locally-thickened region extends from one of the first platform and the second platform to a midspan region of the airfoil and wherein the locally-thickened region has a first thickness, the first thickness being a maximum thickness of the pressure sidewall;
   wherein the suction sidewall has a second thickness, the second thickness being a maximum thickness of the suction sidewall;
   wherein the first thickness is greater than the second thickness; and
   wherein the airfoil comprises a plurality of fiber plies;
   wherein at least one of the plurality of plies is disposed only in the locally thickened region of the airfoil and one of the first platform and the second platform.

2. The vane of claim 1, wherein the first thickness is up to 30% greater than the second thickness.

3. The vane of claim 1, wherein the locally-thickened region extends from 0% to at least 40% and not greater than 60% span of the airfoil.

4. The vane of claim 1, wherein the locally-thickened region extends from 100% to at least 60% and not beyond 40% span of the airfoil.

5. The vane of claim 1, wherein a first subset of the plurality of plies is disposed only in the locally thickened region of the airfoil and a second subset of the plurality of plies are disposed over the first subset of plies and wrap around the airfoil.

6. The vane of claim 1, wherein the at least one additional ply has a curved edge disposed in an midspan region of the airfoil.

7. A method of forming a ceramic matrix composite vane comprising a airfoil extending in span between a first platform and a second platform, the method comprising:
   identifying stress regions in the vane exceeding a threshold value;
   subsequently, forming a preform by:
      laying up a first subset of plies around a mandrel;
      laying up at least one reinforcing ply over the first subset of plies, the at least one reinforcing ply coextensive with the stress regions; and
      laying up a second subset of plies over the at least one reinforcing ply; and
   densifying the preform with a ceramic matrix;
   wherein the first subset of plies and the second subset of plies define the airfoil, the airfoil comprising a leading edge, a trailing edge, a suction sidewall, and a pressure sidewall;
   wherein the at least one reinforcing ply covers only a portion of the span of the airfoil and forms a portion of one of the first platform and the second platform; and
   wherein the second set of plies wraps around the airfoil.

8. The method of claim 7, wherein the at least one reinforcing ply is disposed along the pressure sidewall between 0% span and 50% span.

9. The method of claim 7, wherein the at least one reinforcing ply is disposed along the pressure sidewall between 50% span and 100% span.

10. The method of claim 7 and further comprising: bending the at least one reinforcing ply to form the portion of the first platform of the second platform.

11. The method of claim 7, wherein the step of densifying the preform with a ceramic matrix comprises one or a combination of chemical vapor infiltration, melt infiltration, and polymer infiltration and pyrolysis.

12. The method of claim 7, wherein the at least one additional ply has a curved edge disposed in a midspan region of the airfoil.

13. A vane assembly for a gas turbine engine, the vane assembly comprising:
   an inner case;
   an outer case; and
   at least one ceramic matrix composite (CMC) vane coupled between the inner case and the outer case, the at least one CMC vane comprising:
      an inner diameter platform;
      an outer diameter platform; and
      an airfoil connected to and extending between the inner diameter platform and the outer diameter platform, the airfoil comprising:
         a leading edge;
         a trailing edge;
         a suction sidewall; and
         a pressure sidewall joined to the suction sidewall at the leading edge and the trailing edge, the pressure sidewall comprising a locally-thickened region extending from the inner diameter platform or the outer diameter platform toward a midspan region pressure sidewall, wherein the locally-thickened region has a first thickness, the first thickness being a maximum thickness of the pressure sidewall;

wherein the suction sidewall has a second thickness, the second thickness being a maximum thickness of the suction sidewall;

wherein the first thickness is greater than the second thickness; and wherein the airfoil comprises a plurality of fiber plies;

wherein at least one of the plurality of plies is disposed only in the locally thickened region of the of the pressure sidewall and one of the inner diameter platform and the outer diameter platform.

14. The assembly of claim 13, wherein the first thickness is 30% greater than the second thickness.

15. The assembly of claim 14, wherein the plurality of plies comprises a first subset of plies and a second subset of plies, wherein the at least one reinforcing ply is disposed between the first subset of plies and the second subset of plies.

16. The assembly of claim 13, wherein the at least one additional ply has curved edge disposed in a midspan region of the airfoil.

* * * * *